(12) United States Patent
Clendenin

(10) Patent No.: US 6,439,867 B1
(45) Date of Patent: Aug. 27, 2002

(54) SCROLL COMPRESSOR HAVING A CLEARANCE FOR THE OLDHAM COUPLING

(75) Inventor: Harry Clendenin, Sidney, OH (US)

(73) Assignee: Copeland Corporation, Sidney, OH (US)

( * ) Notice: Subject to any disclaimer, the term of this patent is extended or adjusted under 35 U.S.C. 154(b) by 0 days.

(21) Appl. No.: 09/855,273

(22) Filed: May 14, 2001

(51) Int. Cl.⁷ .............................. F01C 1/04; F16D 3/04
(52) U.S. Cl. .................................... 418/55.3; 464/102
(58) Field of Search ...................... 418/55.3; 464/102

(56) References Cited

U.S. PATENT DOCUMENTS

| | | | |
|---|---|---|---|
| 5,842,845 A | 12/1998 | Kawano et al. | 418/55.3 |
| 5,899,676 A | 5/1999 | Iizuka | 418/55.3 |
| 5,919,034 A | 7/1999 | Kawano et al. | 418/55.3 |
| 5,921,762 A | 7/1999 | Chang et al. | 418/55.3 |
| 5,988,999 A | 11/1999 | Sato et al. | 418/55.3 |
| 6,027,321 A | 2/2000 | Shim et al. | 418/55.1 |

FOREIGN PATENT DOCUMENTS

| | | | | |
|---|---|---|---|---|
| JP | 4-179882 | * | 6/1992 | 418/55.3 |
| JP | 6-10853 | * | 1/1994 | 418/55.3 |
| JP | 11-324943 | * | 11/1999 | |

* cited by examiner

Primary Examiner—John J. Vrablik
(74) Attorney, Agent, or Firm—Harness, Dickey & Pierce, P.L.C.

(57) ABSTRACT

A scroll compressor has a pair of interleaved scrolls. An Oldham coupling is attached to the orbiting scroll to prevent rotation of the orbiting scroll. This Oldham coupling has keys that are slidingly received in slots. One side of each key is loaded while the opposite side is non-loaded. The non-loaded side of the key has a stepped or profiled surface to provide clearance to allow deflection of the key. In another embodiment, the stepped or profiled surface is provided on the non-loaded side of the slot.

16 Claims, 4 Drawing Sheets

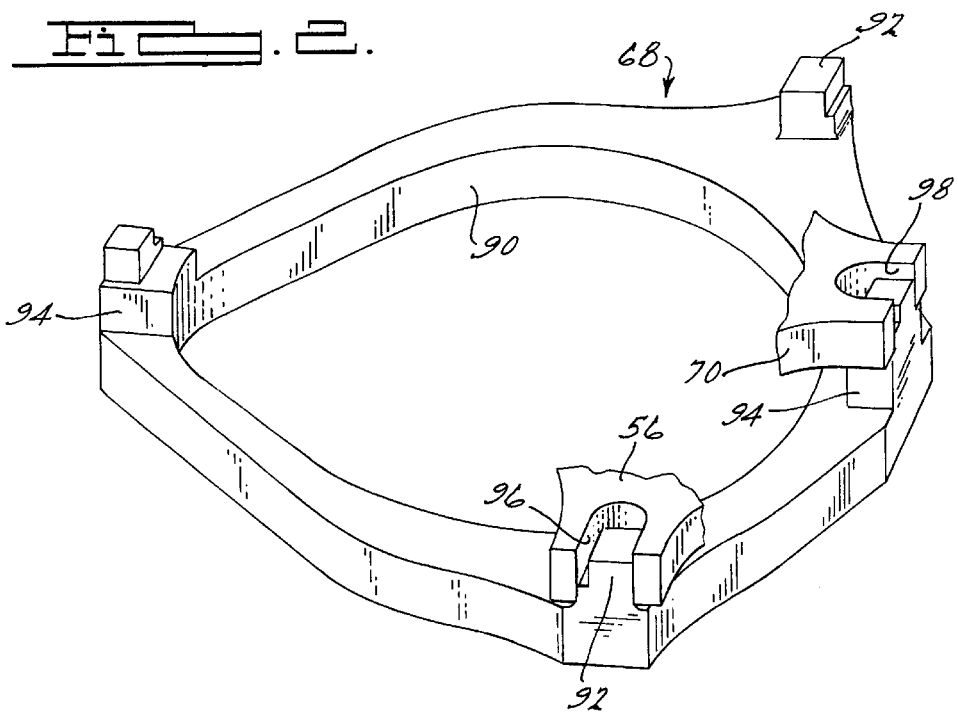
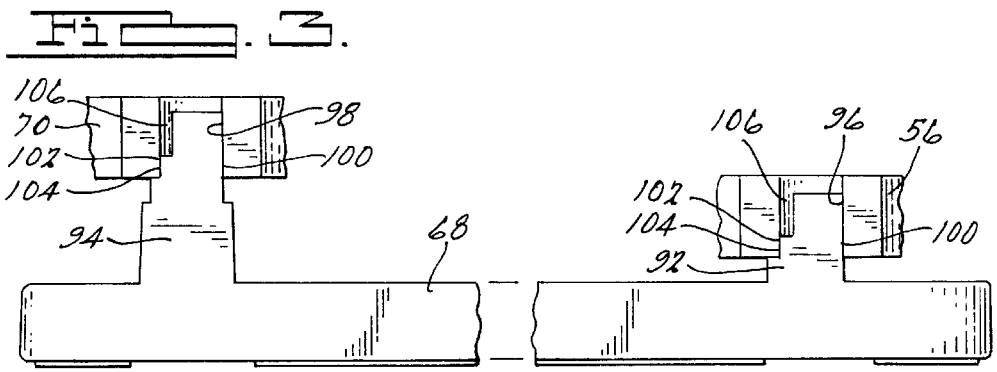
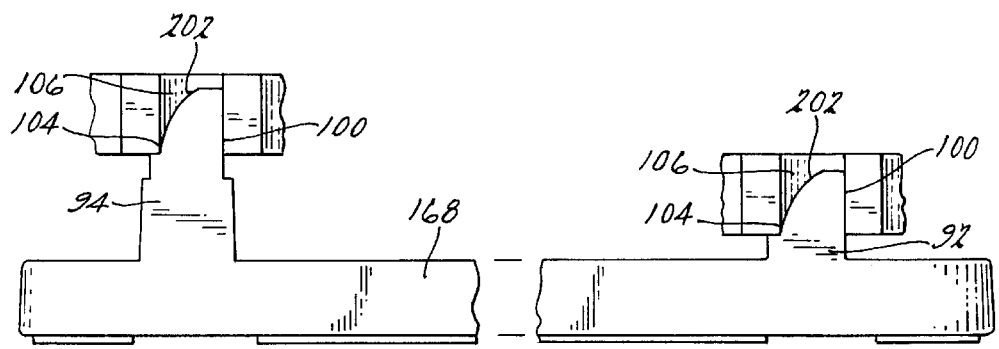

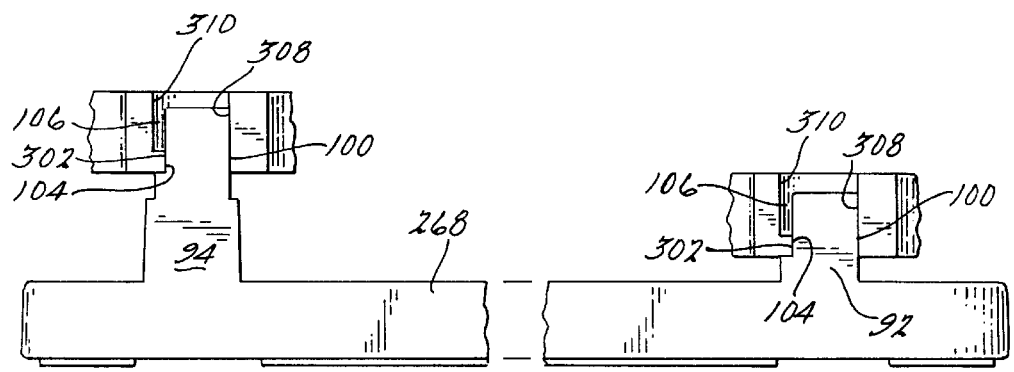
FIG. 5.
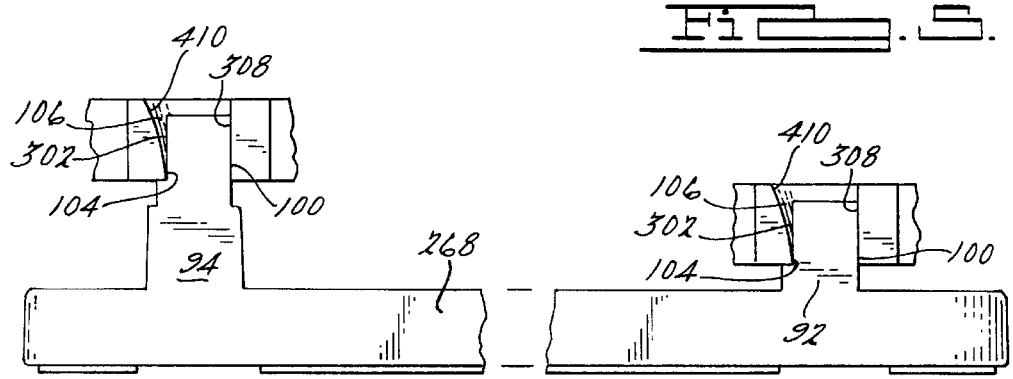
FIG. 6.
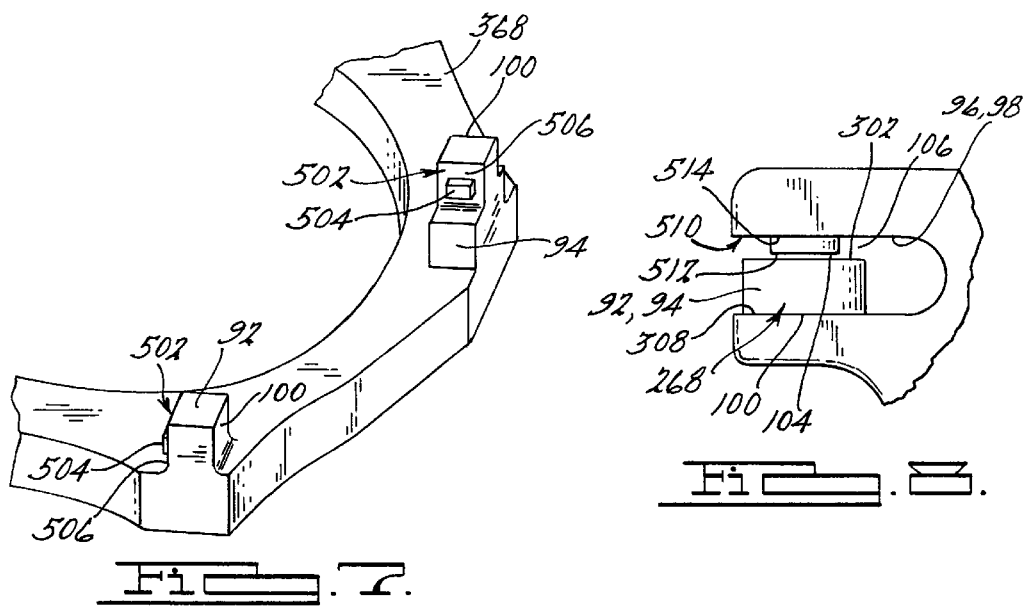
FIG. 7.
FIG. 8.

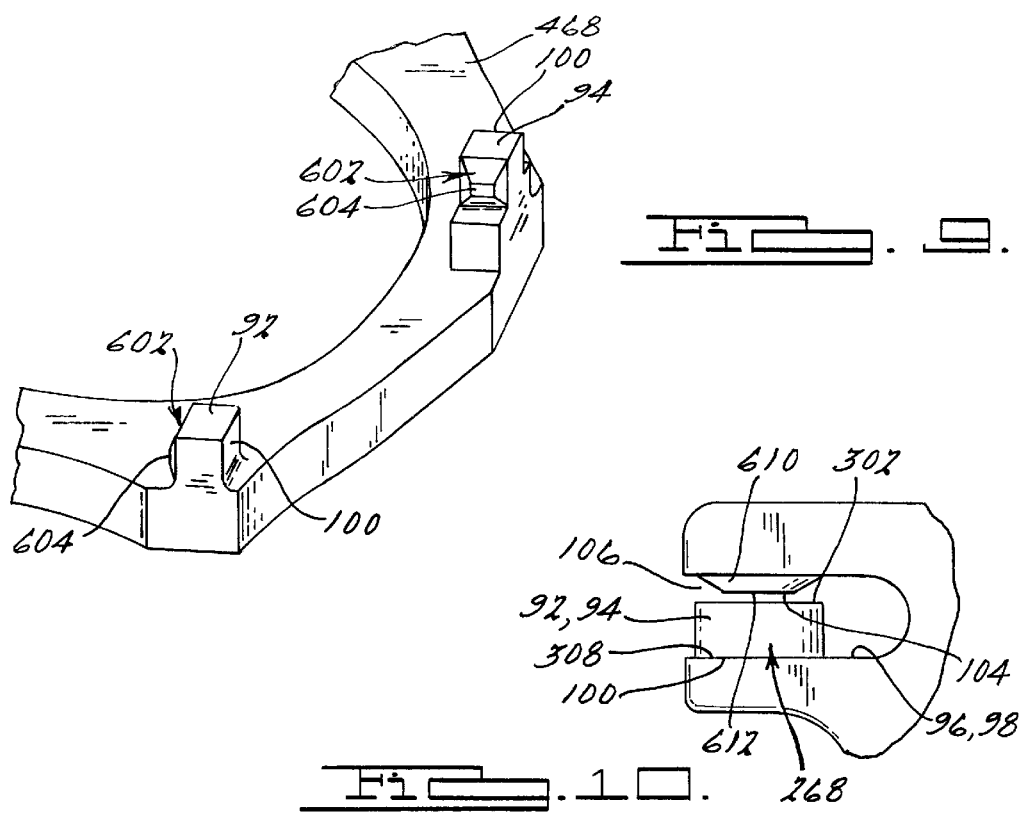

SCROLL COMPRESSOR HAVING A CLEARANCE FOR THE OLDHAM COUPLING

FIELD OF THE INVENTION

The present invention relates to scroll machines. More particularly, the present invention relates to a scroll machine having a clearance between the scrolls and the Oldham coupling which allows deflection of the keys of the Oldham coupling.

BACKGROUND AND SUMMARY OF THE INVENTION

A class of machines exists in the art generally known as scroll machines which are used for the displacement of various types of fluid. The scroll machines can be configured as an expander, a displacement engine, a pump, a compressor etc. and the features of the present invention are applicable to any one of these machines. For purposes of illustration, however, the disclosed embodiment is in the form of a hermetic refrigerant scroll compressor.

Scroll compressors are becoming more and more popular for use as compressors in both refrigeration as well as air conditioning applications due primarily to their capability for extremely efficient operation. Generally, these machines incorporate a pair of intermeshed spiral wraps, one of which is caused to orbit relative to the other so as to define one or more moving chambers which progressively decrease in size as they travel from an outer suction port toward a center discharge port. An electric motor is provided which operates to drive the orbiting scroll member via a suitable drive shaft affixed to the motor rotor. In a hermetic compressor, the bottom of the hermetic shell normally contains an oil sump for lubricating and cooling purposes.

Relative rotation, between the spiral wraps is typically controlled using an Oldham coupling. The Oldham coupling can be keyed to the main bearing housing and the orbiting scroll member, or the Oldham coupling can be keyed to both the orbiting and the non-orbiting scroll members. The keys of the Oldham coupling are slidingly received within slots of the main bearing housing, the orbiting scroll member or the non-orbiting scroll member. In order to reduce the noise generated during the operation of the scroll compressor, the clearance between the keys of the Oldham coupling and its associated slot should be tightly controlled.

When the clearances between the keys of the Oldham coupling and their associated slots is tightly controlled, binding of the keys within their associated slots can occur during times of heavy loading of the Oldham coupling. This binding of the keys within the slots causes excessive loading of the keys as well as generating excessive noise.

The present invention provides the art with a scroll compressor which includes an Oldham coupling which has both a tight tolerance fit of the keys of the Oldham coupling in their associated slots while simultaneously providing a tapered or stepped surface which provides a clearance between the key and the slot for allowing deflection of the keys of the Oldham coupling. The tapered or stepped surface can be located on the keys of the Oldham coupling or the tapered or stepped surface can be located on the sides of the slots within which the keys slide.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a perspective view of the Oldham coupling shown in FIG. 1;

FIG. 3 is a schematic illustration of the relationship between the keys of the Oldham coupling and their associated slot in accordance with the present invention;

FIG. 4 is a schematic illustration of the relationship between the keys of the Oldham coupling and their associated slot in accordance with another embodiment of the present invention;

FIG. 5 is a schematic illustration of the relationship between the keys of the Oldham coupling and their associated slot in accordance with another embodiment of the present invention;

FIG. 6 is a schematic illustration of the relationship between the keys of the Oldham coupling and their associated slot in accordance with another embodiment of the present invention;

FIG. 7 is a perspective view of a key of an Oldham coupling in accordance with another embodiment of the present invention;

FIG. 8 is a schematic illustration of an Oldham coupling key disposed within a slot in accordance with another embodiment of the present invention;

FIG. 9 is a perspective view of a key of an Oldham coupling in accordance with another embodiment of the present invention; and FIG. 10 is a schematic illustration of an Oldham coupling key disposed within a slot in accordance with another embodiment of the present invention.

DETAILED DESCRIPTION OF THE PREFERRED EMBODIMENTS

Figure 1:
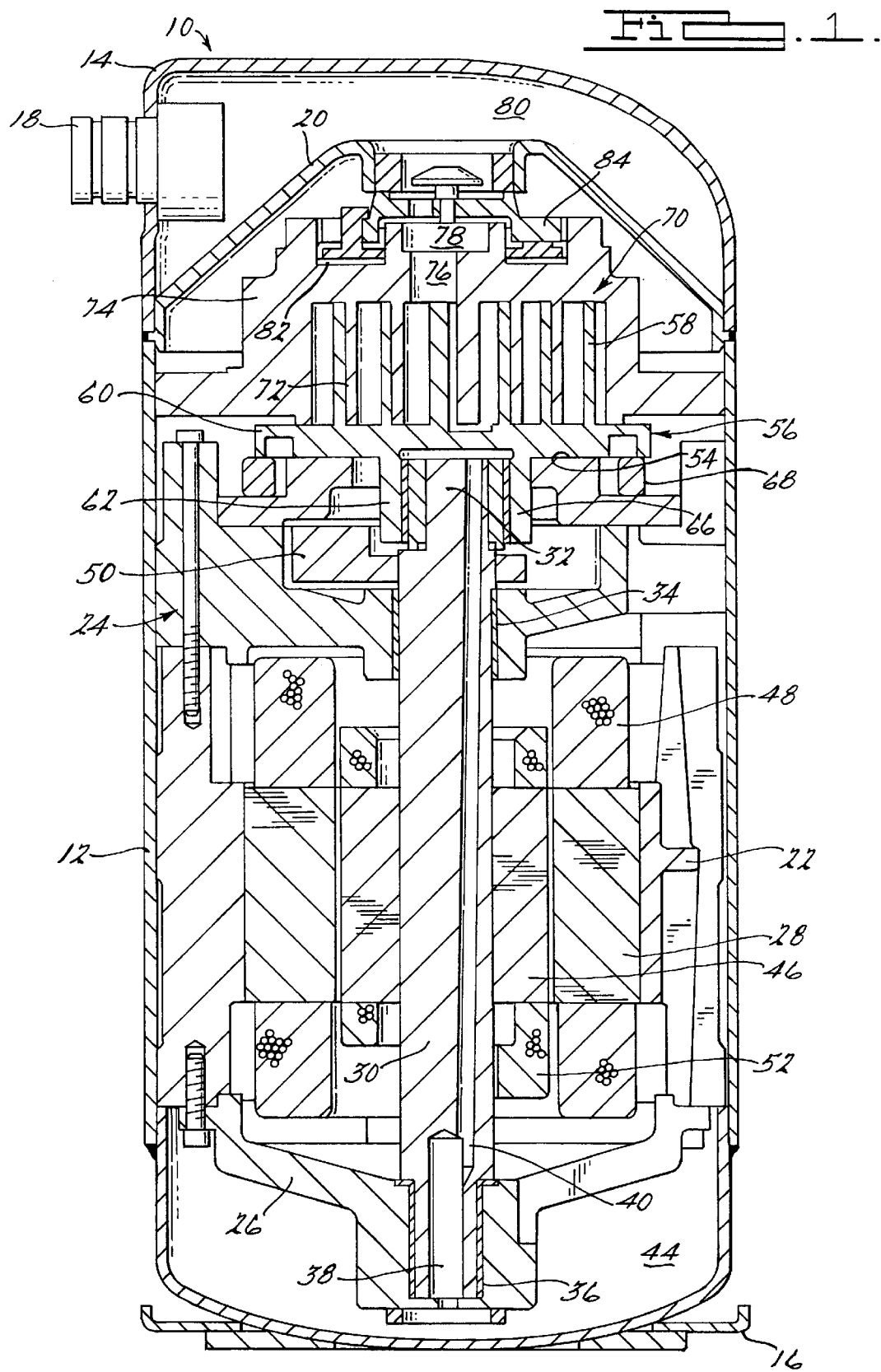
FIG. 1 is a vertical cross section of a hermetic scroll compressor incorporating the unique locating and supporting system of the present invention.

The following description of the preferred embodiment(s) is merely exemplary in nature and is in no way intended to limit the invention, its application, or uses.

Referring now to the drawings in which like reference numerals designate like or corresponding parts throughout the several views, there is shown in FIGS. 1 and 2 a scroll compressor incorporating the unique Oldham coupling in accordance with the present invention and which is indicated generally by the reference numeral 10. Scroll compressor 10 comprises a generally cylindrical hermetic shell 12 having welded at the upper end thereof a cap 14 and at the lower end thereof a base 16 having a plurality of mounting feet (not shown) integrally formed therewith. Cap 14 is provided with a refrigerant discharge fitting 18 which may have the usual discharge valve therein. A transversely extending partition 20 is affixed to shell 12 by being welded about its periphery at the same point that cap 14 is welded to shell 12. A compressor mounting frame 22 is press fit within shell 12 and is supported by the end of base 16. Base 16 is slightly smaller in diameter than shell 12 such that base 16 is received within shell 12 and welded about its periphery as shown in FIG. 1.

Major elements of compressor 10 that are affixed to frame 22 include a two-piece main bearing housing 24, a lower bearing housing 26 and a motor stator 28. A drive shaft or crankshaft 30 having an eccentric crank pin 32 at the upper end thereof is rotatably journaled in a bearing 34 secured within main bearing housing 24 and a second bearing 36 secured within lower bearing housing 26. Crankshaft 30 has at the lower end thereof a relatively large diameter concentric bore 38 which communicates with a radially outwardly positioned smaller diameter bore 40 extending upwardly therefrom to the top of crankshaft 30. The lower portion of the interior of shell 12 defines an oil sump 44 which is filled with lubricating oil to a level slightly above the lower end of a rotor 46, and bore 38 acts as a pump to pump lubricating fluid up crankshaft 30 and into bore 40 and ultimately to all of the various portions of compressor 10 which require lubrication.

Crankshaft 30 is rotatably driven by an electric motor which includes stator 28, winding 48 passing therethrough and rotor 46 press fitted on crankshaft 30. An upper counterweight 50 is secured to crankshaft 30 and a lower counterweight 52 is secured to rotor 46.

The upper surface of two-piece main bearing housing 24 is provided with a flat thrust bearing surface 54 on which is disposed an orbiting scroll member 56 having the usual spiral vane or wrap 58 extending upward from an end plate 60. Projecting downwardly from the lower surface of end plate 60 of orbiting scroll member 56 is a cylindrical hub 62 having a journal bearing 64 therein and in which is rotatively disposed a drive bushing 66 having an inner bore in which crank pin 32 is drivingly disposed. Crank pin 32 has a flat on one surface which drivingly engages a flat surface formed in a portion of the inner bore of drive bushing 66 to provide a radially compliant driving arrangement, such as shown in assignee's U.S. Pat. No. 4,877,382, the disclosure of which is hereby incorporated herein by reference. An Oldham coupling 68 is also provided positioned between orbiting scroll member 56 and two-piece bearing housing 24. Oldham coupling 68 is keyed to orbiting scroll member 56 and to a non-orbiting scroll member 70 to prevent rotational movement of orbiting scroll member 56.

Non-orbiting scroll member 70 is also provided with a wrap 72 extending downwardly from an end plate 74 which is positioned in meshing engagement with wrap 58 of orbiting scroll member 56. Non-orbiting scroll member 70 has a centrally disposed discharge passage 76 which communicates with an upwardly open recess 78 which is in turn in fluid communication with a discharge muffler chamber 80 defined by cap 14 and partition 20. An annular recess 82 is also formed in non-orbiting scroll member 70 within which is disposed a floating seal assembly 84.

Recesses 78 and 82 and floating seal assembly 84 cooperate to define axial pressure biasing chambers which receive pressurized fluid being compressed by wraps 58 and 72 so as to exert an axial biasing force on non-orbiting scroll member 70 to thereby urge the tips of respective wraps 58 and 72 into sealing engagement with the opposed end plate surfaces of end plates 74 and 60, respectively. Floating seal assembly 84 is preferably of the type described in greater detail in assignee's U.S. Pat. No. 5,156,539, the disclosure of which is hereby incorporated herein by reference. Non-orbiting scroll member 70 is designed to be mounted for limited axial movement to two-piece main bearing housing 24 in a suitable manner such as disclosed in the aforementioned U.S. Pat. No. 4,877,382 or assignee's U.S. Pat. No. 5,102,316, the disclosure of which is hereby incorporated herein by reference.

The present invention relates to a unique relationship between the keys of Oldham coupling 68, the slots defined by orbiting scroll member 56 and the slots defined by non-orbiting scroll member 70. Referring now to FIG. 2, Oldham coupling 68 includes a ring 90, a first pair of keys 92 and a second set of keys 94. Keys 92 are each slidingly received within a slot 96 defined by orbiting scroll member 56. Keys 94 are each slidingly received within a slot 98 defined by non-orbiting scroll member 70.

FIG. 3 illustrates the relationship between keys 92 and slots 96 and the relationship between keys 94 and slots 98. Due to the rotation of the various components of compressor 10, each key 92 and each key 94 includes a loaded surface 100 and a non-loaded surface 102. Non-loaded surface 102 is formed as a stepped surface. Stepped surface 102 defines a first clearance 104 between the lower portion of key 92 or 94 and the lower portion of slot 96 and 98, respectively. Stepped surface 102 also defines a second clearance 106 between the upper portion of key 92 or 94 and the upper portion of slot 96 and 98, respectively. First clearance 104 is designed to be a small clearance which is required for quiet operation of compressor 10. Second clearance 106 is designed to be larger than first clearance 104 to permit deflection of key 92 or 94 during high loading conditions for key 92 or 94. By providing a larger clearance at the upper end of key 92 or 94, deflection of key 92 or 94 is allowed and binding of key 92 or 94 within slot 96 and 98, respectively, is eliminated.

Referring now to FIG. 4, an Oldham coupling 168 in accordance with another embodiment of the present invention is illustrated. Oldham coupling 168 includes keys 92 and 94 each having loaded surface 100 and a non-loaded surface 202. Non-loaded surface 202 is formed as a profiled surface to provide a generally tapered section to keys 92 and 94. Profiled surface 202 defines first clearance 104 between the lower portion of keys 92 or 94 and the lower portion of slot 96 and 98, respectively. Profiled surface 202 also defines second clearance 106 between the upper portion of key 92 or 94 and the upper portion of slot 96 and 98, respectively. Similar to the design illustrated in FIG. 3, first clearance 104 is designed to be a small clearance which is required for quiet operation of compressor 10. Second clearance 106 is designed to be larger than first clearance 104 to permit deflection of key 92 or 94 during high loading conditions for key 92 or 94. By providing a larger clearance at the upper end of key 92 or 94, deflection of key 92 or 94 is allowed and binding of key 92 or 94 within slot 96 and 98, respectively, is eliminated.

Referring now to FIG. 5, an Oldham coupling 268 in accordance with another embodiment of the present invention is illustrated. Oldham coupling 268 includes keys 92 and 94 each having loaded surface 100 and a non-loaded surface 302. In this embodiment non-loaded surface 302 is designed as a straight surface which provides a generally rectangular cross section to keys 92 and 94. In the embodiment shown in FIG. 5, slots 96 and 98 each include a loaded surface 308 and a non-loaded surface 310. Non-loaded surface 308 is formed as a stepped surface. Stepped surface 308 defines first clearance 104 between the lower portion of key 92 and 94 and the lower portion of slot 96 and 98, respectively. Stepped surface 308 also defines second clearance 106 between the upper portion of key 92 or 94 and the upper portion of slot 96 and 98, respectively. First clearance 104 is designed to be a small clearance which is required for quiet operation of compressor 10. Second clearance 106 is designed to be larger than first clearance 104 to permit deflection of key 92 or 94 during high loading conditions for key 92 or 94. By providing a larger clearance at the upper end of key 92 or 94, deflection of key 92 or 94 within slot 96 and 98, respectively, is eliminated.

Referring now to FIG. 6, Oldham coupling 268 is illustrated in accordance with another embodiment of the present invention. Oldham coupling 268 includes keys 92 and 94 each having loaded surface 100 and non-loaded surface 302. In this embodiment, slots 96 and 98 each include loaded surface 308 and a non-loaded profiled surface 410. Non-loaded surface 308 is a profiled surface. Profiled surface 410 defines first clearance 104 between the lower portion of keys 92 or 94 and the lower portion of slot 96 and 98, respectively. Profiled surface 410 also defines second clearance 106 between the upper portion of key 92 or 94 and the upper portion of slot 96 and 98, respectively. First clearance 104 is designed to be a small clearance which is required for quiet operation of compressor 10. Second clearance 106 is designed to be larger than first clearance 104 to permit deflection of key 92 or 94 during high loading conditions for key 92 or 94. By providing a larger clearance at the upper end of key 92 or 94, deflection of key 92 or 94 within slot 96 and 98, respectively, is eliminated.

Referring now to FIG. 7, an Oldham coupling 368 in accordance with another embodiment of the present invention is illustrated. Oldham coupling 368 includes keys 92 and 94 each having loaded surface 100 and a non-loaded surface 502. Non-loaded surface 502 is formed as a stepped surface having a platform 504 extending from a base surface 506 of keys 92 and 94. Platform 504 defines first clearance 104 between key 92 or 94 and slot 96 and 98, respectively. Base surface 506 defines second clearance 106 between key 92 or 94 and slot 96 and 98, respectively. First clearance 104 is designed to be a small clearance which is required for quiet operation of compressor 10. Second clearance 106 is designed to be larger than first clearance 104 to permit deflection of key 92 or 94 during high loading conditions for key 92 or 94. By providing a larger clearance for a portion of the slot engaging surface of key 92 or 94, deflection of key 92 or 94 is allowed and binding of key 92 or 94 within slot 96 and 98, respectively, is eliminated. The size of platform 504 is designed such that enough surface area remains to withstand the reverse loading that is encountered.

Referring now to FIG. 8, Oldham coupling 268 is illustrated in accordance with another embodiment of the present invention. Oldham coupling 268 includes keys 92 and 94 each having loaded surface 100 and non-loaded surface 302. In this embodiment slots 96 and 98 each include loaded surface 308 and a non-loaded surface 510. Non-loaded surface 510 is formed as a stepped surface having a platform 512 extending from a base surface 514 of keys 92 and 94. Platform 512 defines first clearance 104 between key 92 or 94 and slot 96 and 98, respectively. Base surface 514 defines second clearance 106 between key 92 or 94 and slot 96 and 98, respectively. First clearance 104 is designed to be a small clearance required for quiet operation of compressor 10. Second clearance 106 is designed to be larger than first clearance 104 to permit deflection of key 92 or 94 during high loading for key 92 or 94. By providing a larger clearance for a portion of the slot engaging surface of key 92 or 94, deflection of key 92 or 94 is allowed and binding of key 92 or 94 within slot 96 and 98, respectively, is eliminated. The size of platform 512 is designed such that enough surface area remains to withstand the reverse loading that is encountered.

Referring now to FIG. 9, an Oldham coupling 468 in accordance with another embodiment of the present invention is illustrated. Oldham coupling 468 includes keys 92 and 94 each having loaded surface 100 and a non-loaded surface 602. Non-loaded surface 602 is formed as a tapered stepped surface having a platform 604 extending from keys 92 and 94. Platform 604 defines first clearance 104 between key 92 or 94 and slot 96 and 98, respectively. The tapered portion of platform 604 defines second clearance 106 between key 92 or 94 and slot 96 and 98, respectively. First clearance 104 is designed to be a small clearance which is required for quiet operation of compressor 10. Second clearance 106 is designed to be larger than first clearance 104 to permit deflection of key 92 or 94 during high loading conditions for key 92 or 94. By providing a larger clearance for a portion of the slot engaging surface of key 92 or 94, deflection of key 92 or 94 is allowed and binding of key 92 or 94 within slot 96 and 98, respectively, is eliminated. The size of platform 604 is designed such that enough surface area remains to withstand the reverse loading that is encountered.

Referring now to FIG. 10, Oldham coupling 268 is illustrated in accordance with another embodiment of the present invention. Oldham coupling 268 includes keys 92 and 94 each having loaded surface 100 and non-loaded surface 302. In this embodiment slots 96 and 98 each include loaded surface 308 and a non-loaded surface 610. Non-loaded surface 610 is formed as a tapered stepped surface having a platform 612 extending from keys 92 and 94. Platform 612 defines first clearance 104 between key 92 or 94 and slot 96 and 98, respectively. The tapered portion of platform 612 defines second clearance 106 between key 92 or 94 and slot 96 and 98, respectively. First clearance 104 is designed to be a small clearance required for quiet operation of compressor 10. Second clearance 106 is designed to be larger than first clearance 104 to permit deflection of key 92 or 94 during high loading for key 92 or 94. By providing a larger clearance for a portion of the slot engaging surface of key 92 or 94, deflection of key 92 or 94 is allowed and binding of key 92 or 94 within slot 96 and 98, respectively, is eliminated. The size of platform 612 is designed such that enough surface area remains to withstand the reverse loading that is encountered.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A scroll machine comprising:

an outer shell;

a first scroll member disposed within said shell, said first scroll member having a first spiral wrap projecting outwardly from a first end plate;

a second scroll member disposed within said shell, said second scroll member having a second spiral wrap projecting outwardly from a second end plate, said second scroll wrap being interleaved with said first spiral wrap to define a plurality of moving chambers therebetween when said second scroll member orbits with respect to said first scroll member;

a coupling disposed between said second scroll member and a non-moving component of said scroll machine, said coupling having a ring and a first key extending from said ring, said first key being disposed within a first slot defined by said second scroll member, said first key having a loaded surface in contact with said second scroll member and a non-loaded surface defining a first clearance with said second scroll member, said first clearance with said second scroll member having a first dimension proximate to said ring and a second dimension distal from said ring, said second dimension being greater than said first dimension.

2. The scroll machine in accordance with claim 1, wherein said first key includes a stepped surface which defines said first and second dimensions.

3. The scroll machine in accordance with claim 1, wherein said first key includes a profiled surface which defines said first and second dimensions.

4. The scroll machine in accordance with claim 1, wherein said second scroll member includes a stepped surface forming said first slot which defines said first and second dimensions.

5. The scroll machine in accordance with claim 1, wherein said second scroll member includes a profiled surface forming said first slot which defines said first and second dimensions.

6. The scroll machine in accordance with claim 1 wherein said non-moving component is said first scroll member.

7. The scroll machine in accordance with claim 1, wherein said coupling has a second key extending from said ring, said second key being disposed within a second slot defined by said non-moving component, said second key having a loaded surface in contact with said non-moving component and a non-loaded surface defining a clearance with said non-moving component, said clearance with said non-moving component having a third dimension proximate to said ring and a fourth dimension distal from said ring, said fourth dimension being greater than said third dimension.

8. The scroll machine in accordance with claim 7 wherein said non-moving component is said first scroll member.

9. The scroll machine in accordance with claim 7, wherein said second key includes a stepped surface which defines said third and fourth dimensions.

10. The scroll machine in accordance with claim 9, wherein said first key includes a stepped surface which defines said first and second dimensions.

11. The scroll machine in accordance with claim 7, wherein said second key includes a profiled surface which defines said third and fourth dimensions.

12. The scroll machine in accordance with claim 11, wherein said first key includes a profiled surface which defines said first and second dimensions.

13. The scroll machine in accordance with claim 7, wherein said non-moving component includes a stepped surface forming said second slot which defines said third and fourth dimensions.

14. The scroll machine in accordance with claim 13, wherein said second scroll member includes a stepped surface forming said first slot which defines said first and second dimensions.

15. The scroll machine in accordance with claim 7, wherein said non-moving component includes a profiled surface forming said second slot which defines said third and fourth dimensions.

16. The scroll machine in accordance with claim 15, wherein said second scroll member includes a profiled surface defining said first slot which defines said first and second dimensions.

* * * * *